United States Patent
Frederiksen et al.

(10) Patent No.: US 7,539,207 B2
(45) Date of Patent: May 26, 2009

(54) METHOD AND BASE STATION FOR CONTROLLING LINK ADAPTATION AND PACKET SCHEDULING IN HIGH SPEED DOWNLINK PACKET ACCESS (HSDPA) RADIO SYSTEM

(75) Inventors: Frank Frederiksen, Klarup (DK); Troels Emil Kolding, Klarup (DK)

(73) Assignee: Nokia Siemens Networks Oy, Espoo (FI)

(*) Notice: Subject to any disclaimer, the term of this patent is extended or adjusted under 35 U.S.C. 154(b) by 1046 days.

(21) Appl. No.: 10/690,832

(22) Filed: Oct. 23, 2003

(65) Prior Publication Data

US 2005/0047387 A1 Mar. 3, 2005

(30) Foreign Application Priority Data

Aug. 26, 2003 (FI) .................................. 20031200

(51) Int. Cl.
*H04J 3/22* (2006.01)
(52) U.S. Cl. ........................ 370/465; 370/477; 370/252; 370/235; 370/331; 714/748
(58) Field of Classification Search ................. 370/310, 370/310.1, 310.2, 311, 312, 328, 329, 331, 370/335, 336, 342, 431, 441, 332, 333, 334, 370/465, 477, 522, 235, 252; 714/748
See application file for complete search history.

(56) References Cited

U.S. PATENT DOCUMENTS

| | | | | |
|---|---|---|---|---|
| 6,909,881 B2* | 6/2005 | Uehara et al. | ................ | 455/69 |
| 7,047,473 B2* | 5/2006 | Hwang et al. | ................ | 714/751 |
| 7,197,021 B2* | 3/2007 | Seo et al. | ................ | 370/335 |
| 7,206,332 B2* | 4/2007 | Kwan et al. | ................ | 375/140 |
| 7,319,718 B2* | 1/2008 | Roh et al. | ................ | 375/224 |
| 7,352,722 B2* | 4/2008 | Malladi et al. | ................ | 370/335 |
| 7,359,327 B2* | 4/2008 | Oshiba | ................ | 370/235 |
| 7,372,836 B2* | 5/2008 | Hwang et al. | ................ | 370/335 |
| 7,406,070 B2* | 7/2008 | Nilsson | ................ | 370/342 |
| 7,450,611 B2* | 11/2008 | Kim et al. | ................ | 370/471 |
| 2006/0056501 A1* | 3/2006 | Shinoi et al. | ................ | 375/225 |

FOREIGN PATENT DOCUMENTS

| | | |
|---|---|---|
| CN | 1742454 | 3/2006 |
| EP | 1587233 | 10/2005 |

OTHER PUBLICATIONS

Chinese Office Action for Application No. 200410064438.2.
3rd Generation Partnership Project; Technical Specification Group Radio Access Network; Multiplexing and channel coding (FDD) (Release 5).

* cited by examiner

*Primary Examiner*—Wing F. Chan
*Assistant Examiner*—Mark A. Mais
(74) *Attorney, Agent, or Firm*—Squire, Sanders and Dempsey L.L.P.

(57) ABSTRACT

A method of controlling link adaptation and packet scheduling in an HSDPA (High Speed Downlink Packet Access) radio system and an HSDPA base station communicating over a control channel with one or more user equipment units is provided. According to one embodiment the base station includes a device for receiving feedback information from the user equipment. The base station further includes a device for calculating a quality estimate related to the feedback information and executing link adaptation and packet scheduling based on the calculated quality estimate.

19 Claims, 3 Drawing Sheets

METHOD AND BASE STATION FOR CONTROLLING LINK ADAPTATION AND PACKET SCHEDULING IN HIGH SPEED DOWNLINK PACKET ACCESS (HSDPA) RADIO SYSTEM

BACKGROUND OF THE INVENTION

1. Field of the Invention

The invention relates to HSDPA (High Speed Downlink Packet Access) radio systems. More precisely, the invention relates to controlling link adaptation and packet scheduling in an HSDPA radio system.

2. Description of the Related Art

In the ongoing standardization work in WCDMA (Wideband Code Division Multiple Access) evolution in 3GPP (3rd Generation Partnership Project), a concept called HSDPA (high speed downlink packet access) has been introduced for Release 5. One of the central elements of this concept is a fast layer one scheduling combined with a hybrid automatic repeat request (H-ARQ). The fast layer one scheduling attempts to exploit the current channel conditions as well as possible to achieve high instantaneous throughput.

The layer one scheduling includes two essential parts: a link adaptation and a packet scheduling. The link adaptation in HSDPA is the ability to adapt the modulation scheme, the number of multicodes and forward error correction coding according to the quality of the radio link. The link adaptation determines the data rate to be used for the given channel conditions and the packet scheduling determines when a user is active on the HS-DSCH (High Speed-Downlink Shared Channel). Scheduling of the transmission of data packets over the air interface is performed in Node B (Base Transceiver station, BTS). The H-ARQ feature provides a mechanism to retransmit a packet if it is received erroneously. In HSDPA, the request for retransmission of the data packets is processed in the base station. For the scheduling unit to obtain knowledge of the instantaneous channel conditions, a feedback channel has been introduced from the user equipment to the Node B called HS-DPCCH (High Speed-Dedicated Physical Control Channel). This channel carries a channel quality indicator (CQI), which informs the Node B about the current downlink channel conditions.

Furthermore, this channel carries signalling to acknowledge whether a previously received packet has been detected correctly or not (H-ARQ ACK (positive acknowledgement)/NACK (negative acknowledgement) information). The H-ARQ information is used by the Node B to determine if a packet is to be retransmitted, and the CQI is used by the link adaptation to determine the modulation and coding schemes as well as the number of multicodes to be used for transmissions towards the user in question. The CQI measurements and the operation of the link adaptation mechanism can also be used to aid the decision making of the packet scheduler to improve utilization of the network resources. In some modes, the link adaptation mechanism can also be improved by employing measurements of the power used for the associated downlink DPCH (Dedicated Physical Channel) controlled by power control commands sent on from the user equipment to the Node B. However, when the user equipment is in soft handover (SHO), the power control will operate relative to more than one Node B, and consequently this measure cannot be used to estimate the channel conditions.

In order to provide a better uplink coverage, the HSDPA concept allows the repetition of the CQI and ACK/NACK information. However, from the perspective of link adaptation and packet scheduling, this causes extra delays in the link adaptation cycle, which again leads to a significantly decreased link and system performance in most cases. After the propagation to the Node B, a code word is estimated and assuming there are no delays in the Node B, a decision for transmission is taken for this user equipment. For example, if a repetition factor 3 is used for the HS-DPCCH and a 'zero-delay' assumption for the Node B processing, then the CQI value can be utilized after 12 slots, corresponding to 8 milliseconds.

The problem with this is that the CQI information gets 'older' with increased delays, and therefore contains less information about the current channel conditions. This is particularly a problem in the case of soft handover where the Node B can only rely on the CQI reports since the power measurements from the associated downlink DPCH will not give the information on the link quality between the Node B in charge of the HSDPA link and the user equipment. Thus, there is a need for an improved link adaptation performance in the Node B.

SUMMARY OF THE INVENTION

According to an embodiment of the invention, there is provided a method of controlling link adaptation and packet scheduling in an HSDPA (High Speed Downlink Packet Access) radio system. The method includes the step of providing feedback information from the user equipment to a base station over a control channel. The method also includes the steps of calculating a quality estimate related to the feedback information by the base station and executing link adaptation and packet scheduling based on the calculated quality estimate by the base station.

According to another embodiment of the invention, there is provided an HSDPA (High Speed Downlink Packet Access) base station communicating over a control channel with one or more user equipment units. The base station includes a device for receiving feedback information from the user equipment. The base station further includes a device for calculating a quality estimate related to the feedback information and executing link adaptation and packet scheduling based on the calculated quality estimate.

The method and system of the invention provide several advantages. For example, in one embodiment of the invention, the CQI estimate accuracy is improved. Another advantage is that the link adaptation delay is reduced and the throughput performance is improved because the packet scheduling and link adaptation can decide to accept a quality value even before all possible repetitions have been received. The link adaptation robustness and thus, the link and system performance are improved.

BRIEF DESCRIPTION OF THE DRAWINGS

In the following, the invention will be described in greater detail with reference to the preferred embodiments and the accompanying drawings, in which.

DETAILED DESCRIPTION OF THE PREFERRED EMBODIMENTS

Figure 1:
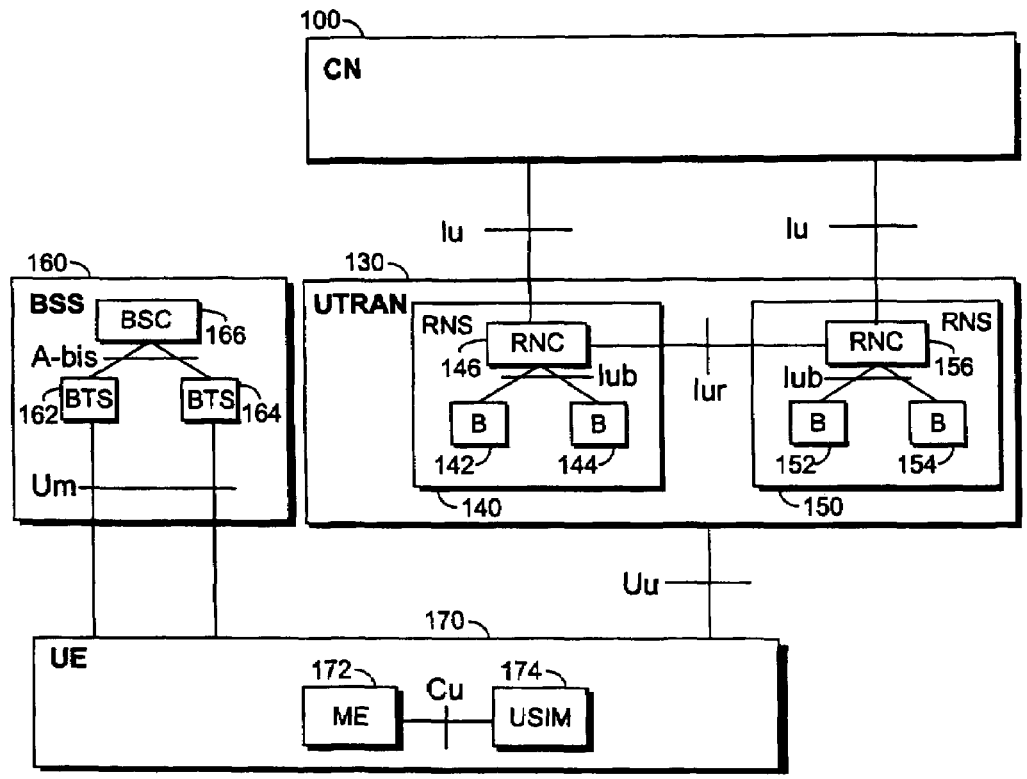
FIG. 1 is a simplified block diagram illustrating the structure of a radio system which may be employed in an embodiment of the invention.

FIG. 1 illustrates an example of a radio system in which the embodiments of the invention can be applied. A radio system in FIG. 1, known at least as UMTS (Universal Mobile Telecommunications System) and IMT-2000 (International Mobile Telecommunications 2000) represents the third-generation radio systems. The embodiments of the invention are, however, not restricted to these systems described by way of example, but one skilled in the art can also apply the instructions to other radio systems containing corresponding characteristics.

FIG. 1 is a simplified block diagram, which shows the most important parts of a radio system and the interfaces between them at network-element level. The structure and functions of the network elements are not described in detail, because they are generally known.

In the embodiment shown in FIG. 1, the main parts of a radio system may include a core network (CN) 100, a radio access network 130 and user equipment (UE) 170. The term UTRAN is the acronym for UMTS Terrestrial Radio Access Network, i.e. the radio access network 130 belongs to the third generation and is implemented by wideband code division multiple access (WCDMA) technology. FIG. 1 also shows a base station system 160 which belongs to the 2/2.5 generation and is implemented by time division multiple access (TDMA) technology, but it is not further described in this discussion.

On a general level, the radio system can also be defined to include user equipment, which is also known, for instance, as a subscriber terminal and mobile phone and a network part. The network part includes the fixed infrastructure of the radio system, i.e. the core network, radio access network and base station system.

The structure of the core network 100 may correspond to a combined structure of the GSM and GPRS systems. The GSM network elements may be responsible for establishing circuit-switched connections, and the GPRS network elements may be responsible for establishing packet-switched connections. Some of the network elements may, however, be included in both systems.

The base station system 160 may include a base station controller (BSC) 166 and base transceiver stations (BTS) 162, 164. The base station controller 166 controls the base transceiver station 162, 164. The devices that implement the radio path and their functions may reside in the base transceiver station 162, 164, and the control devices may reside in the base station controller 166.

The base station controller 166 takes care of the following tasks, for instance: radio resource management of the base transceiver station 162, 164, intercell handovers, frequency control, i.e. frequency allocation to the base transceiver stations 162, 164, management of frequency hopping sequences, time delay measurement on the uplink, implementation of the operation and maintenance interface, and power control.

The base transceiver station 162, 164 may contain at least one transceiver, which provides one carrier, i.e. eight time slots, i.e. eight physical channels. Typically, one base transceiver station 162, 164 serves one cell, but it is also possible to have a solution in which one base transceiver station 162, 164 serves several sectored cells. The diameter of a cell can vary from a few meters to tens of kilometres. The base transceiver station 162, 164 may also include a transcoder, which converts the speech-coding format used in the radio system to that used in the public switched telephone network and vice versa. In practice, the transcoder may be, however, physically located in the mobile ser-vices switching center 102. The tasks of the base transceiver station 162, 164 include: calculation of timing advance (TA), uplink measurements, channel coding, encryption, decryption, and frequency hopping.

In the embodiment of FIG. 1, the radio access network 130 is made up of radio network subsystems 140, 150. Each radio network subsystem 140, 150 is made up of radio network controllers 146, 156 and B nodes 142, 144, 152, 154. A B node is a rather abstract concept, and often the term base transceiver station is used instead of it.

Operationally, the radio network controller 140, 150 corresponds approximately to the base station controller 166 of the GSM system, and the B node 142, 144, 152, 154 corresponds approximately to the base transceiver station 162, 164 of the GSM system. Embodiments of the invention may be configured so that the same device serves as both the base transceiver station and the B node. The same device may be capable of implementing both the TDMA and WCDMA radio interface simultaneously.

The user equipment 170 may include mobile equipment (ME) 172 and UMTS subscriber identity module (USIM) 174. USIM 174 contains information related to the user and information related to information security in particular, for instance, an encryption algorithm.

In UMTS networks, the user equipment 170 can be simultaneously connected with a plurality of base transceiver stations (Node B) in occurrence of soft handover.

In UMTS, the interfaces between network elements may be the Iu interface between the core network and the radio access network, which is divided into the interface IuCS on the circuit-switched side and the interface IuPS on the packet-switched side, and the Uu interface between the radio access network and the user equipment. In GSM, the interfaces may include the A interface between the base station controller and the mobile services switching center, the Gb interface between the base station controller and the serving GPRS support node, and the Um interface between the base transceiver station and the user equipment. The interface defines what kind of messages different network elements can use in communicating with each other. The purpose of the interfaces is to provide a radio system in which the network elements of different manufacturers interwork so well as to provide an effective radio system. In practice, some of the interfaces are, however, vendor-dependent.

The HSDPA (High Speed Downlink Packet Access) concept has been introduced to increase packet data throughput by means of fast physical layer retransmission and transmission combining as well as fast link adaptation controlled by the base station. In HSDPA, the scheduling and link adaptation decisions are performed in the base station. The HS-DPCCH (High Speed-Dedicated Physical Control Channel) is used in HSDPA for providing feedback information from the user equipment 170 to the base station (Node B). The HS-DPCCH carries the necessary control information in the uplink, that is, ARQ acknowledgements (both positive and negative) and downlink quality feedback information.

Figure 2:
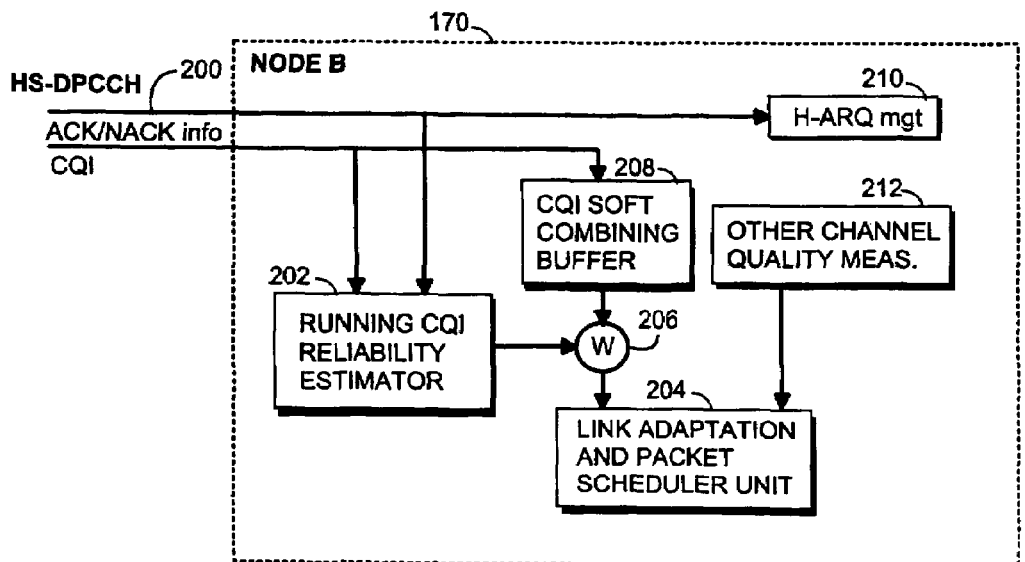
FIG. 2 shows a simplified outline of an embodiment of the invention.

FIG. 2 shows a simplified outline of an embodiment of the invention. The base station 170 may include the following elements: a running CQI reliability estimator 202, a link adaptation and packet scheduler unit 204, a weighting unit 206, a CQI soft combining buffer 208, a H-ARQ manager 210 and a unit for other channel quality measurements 212. In an embodiment of the invention, an HSDPA base station 170 communicates over a control channel 200 with one or more user equipment units and include a device for receiving feedback information from the user equipment. The control channel 200 may be an HS-DPCCH (High Speed-Dedicated Physical Control Channel) channel or a DPCCH (Dedicated Physical Control Channel) channel, for example. The HS-DPCCH channel 200 may be monitored in a Running CQI reliability estimator 202. By monitoring the HS-DPCCH, the reliability of the information sent on this channel may be extracted. A link adaptation and packet scheduler unit 204 may be informed about the reliability. The reliability results may then be used in scheduling and transmission decisions to improve the link and system performance. Similar improvements may also be made towards a H-ARQ manager 210, which detects the ACK/NACK information.

The base station 170 may include a device for calculating a quality estimate related to the feedback information and executing link adaptation and packet scheduling based on the calculated quality estimate. The feedback information may include H-ARQ information bits and/or channel quality indicator information bits. The device for calculating the quality estimate may calculate estimates of the H-ARQ information by averaging the received H-ARQ information bits. It is possible that the device for calculating the quality estimate is configured to calculate estimates of the channel quality indicator information by calculating a set of legal code words corresponding to different channel quality values, and for using the difference between the received channel quality indicator information and the set of legal code words to calculate the channel quality estimate.

It is possible that the link adaptation and packet scheduling only consider the received quality estimate in their calculations, when the calculated quality estimate shows sufficiently high reliability (or give it priority according to the estimated quality). In an embodiment, the base station 170 further includes device 212 for measuring a second piece of feedback information from associated DPCH channel and device 206 for weighting a use of the channel quality indicator compared to the second piece of feedback information from the associated DPCH channel. It is also feasible to repeat the sending of the feedback information until the calculated quality estimate shows high reliability.

In embodiments of the invention, an uplink channel quality estimator as well as a filtering function for reducing the delay and improving the accuracy of the CQI estimates, which are transmitted to the link adaptation and packet scheduling unit 204 of the base station 170, are introduced. In an embodiment, a decision metric for the estimation of the CQI value transmitted by the user equipment may be calculated. The decision metric may be used as a quality indicator for both the H-ARQ information and the CQI information. Using this quality estimate, the link adaptation can decide whether to use the CQI information in the allocation of the base station 170 for the associated user equipment. Likewise, the quality estimate may be used for the evaluation of the H-ARQ information. In an embodiment, the quality estimate may be used in a situation where repetition of the CQI information is enabled. In this situation, the packet scheduling and link adaptation unit 204 may decide to accept a CQI value even before all repetitions have been received, thus reducing the link adaptation delay and improving the throughput performance.

Figure 3:
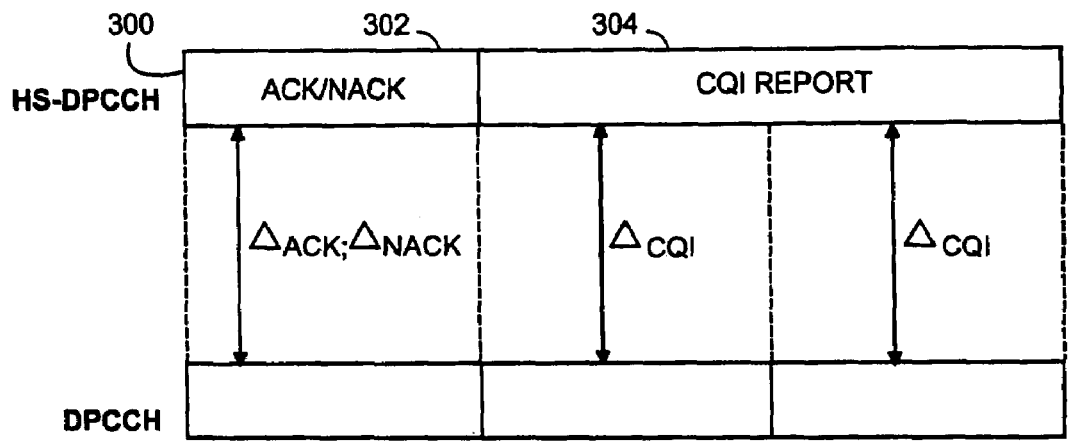
FIG. 3 illustrates a format of an HS-DPCCH channel.

FIG. 3 illustrates an example of the format of the HS-DPCCH channel 300 and the corresponding power offsets. In the transmission of the HS-DPCCH channel 300, the H-ARQ information may be transmitted during the first slot 302 of the HS-DPCCH channel 300. The CQI information may be transmitted during the last two slots 304. A set of power offsets is defined for the HS-DPCCH to ensure a well-defined performance for the two signalled parameters.

Figure 4:
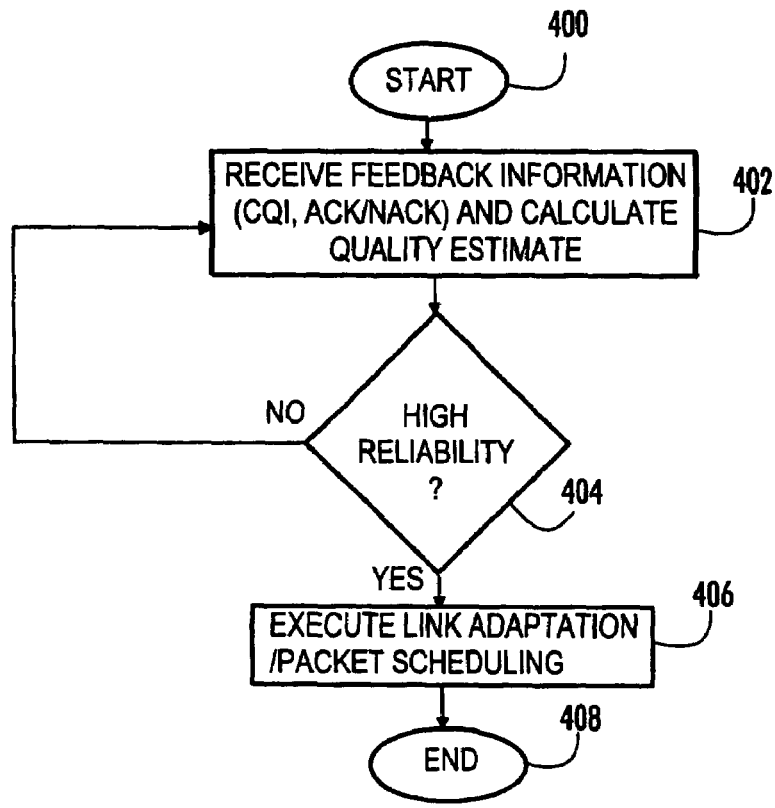
FIGS. 4 and 5 show embodiments of the method of controlling link adaptation and packet scheduling in an HSDPA radio system according to an embodiment of the invention.

FIG. 4 shows an embodiment of the method of controlling link adaptation and packet scheduling in an HSDPA radio system. In this embodiment, there is a soft handover situation where there are no other alternatives available for conducting the link adaptation than the CQI report. The link adaptation bases its adaptive modulation and coding on the CQI reports alone. One reason for this is that the indirect power measurements based on the power control commands for the associated downlink DCH may operate towards more than one base station and therefore it may not contain information on the quality of the single link between the HSDPA responsible base station and the user equipment. If it is necessary to wait for all the repetitions to be completed, a significant AMC delay may arise, which will reduce the mobility support in the HSDPA for the soft handover users. If the first CQI transmission shows a high reliability, the following repetitions may be forgotten (although these are still transmitted by the user equipment). This speeds up the link adaptation delay cycle, which can have a significant impact on the HSDPA performance even at moderate user equipment speeds. If the reliability of the CQI report is still low even after all repetitions have been completed, scheduling may be performed when the CQI reports are reliable in order to prevent erroneous link adaptation.

The method of controlling link adaptation and packet scheduling starts in 400 in FIG. 4. In 402, the feedback information, such as CQI and ACK/NACK information, is received and a quality estimate is calculated in the base station. The quality estimate may be a CQI estimate, for example. In 404, it is detected whether the calculated quality estimate shows high reliability. If the quality estimate is reliable enough, then process advances to 406, where the link adaptation and the packet scheduling is executed by the base station, in the link adaptation and packet scheduling unit, for example. The method ends in 408. If, in 404, it is detected that the quality estimate is not reliable enough, then the feedback information is received again in 402. Depending on the embodiment, the reception of the feedback information may be stopped or at least neglected, if the calculated quality estimate has shown high reliability.

Figure 5:
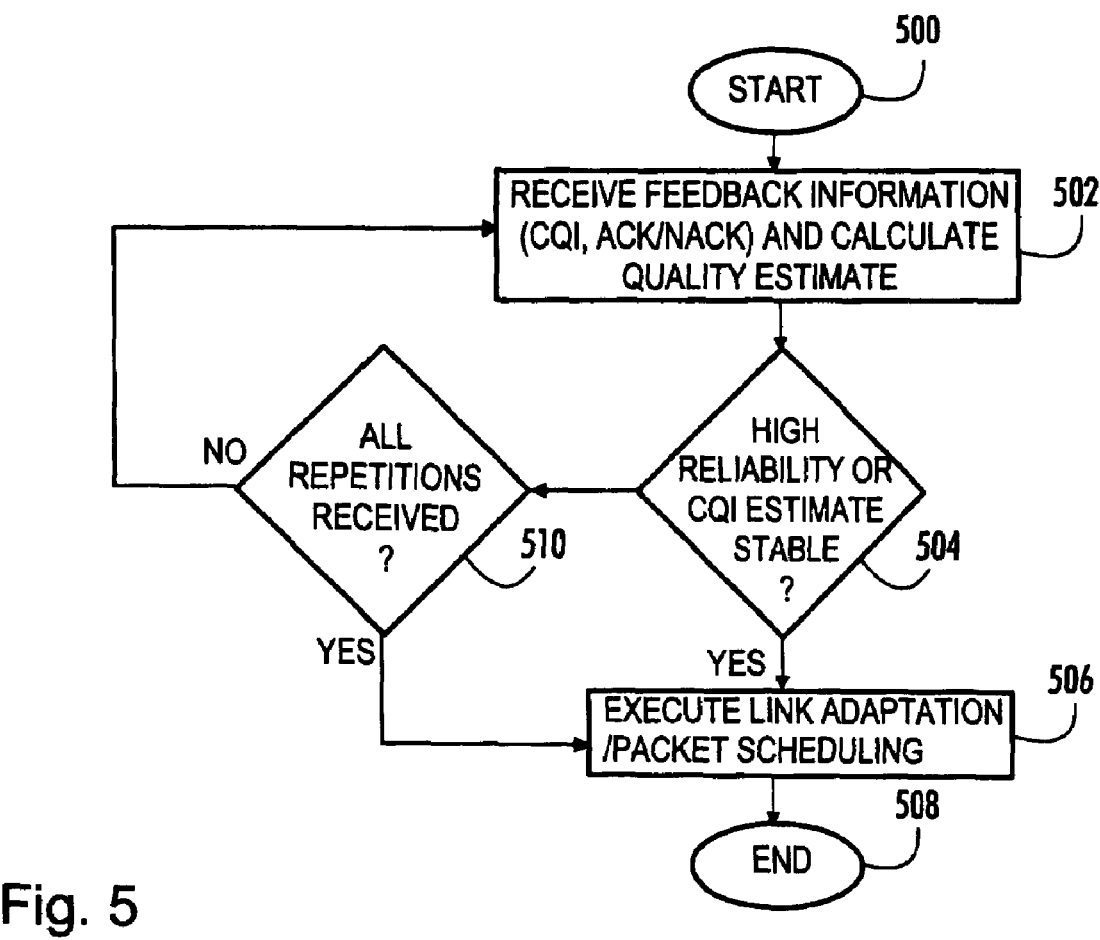

FIG. 5 shows another embodiment of the method of controlling link adaptation and packet scheduling in an HSDPA radio system. In a situation where there is only the CQI report for conducting the link adaptation, and the reliability of the CQI is very low, a lot of additional retransmissions or waste channel quality resources may be stopped. The CQI reliability estimate may be used to evaluate whether it makes sense to schedule a transmission to a particular user at a given time. Also, adding some filtering over time is possible in such a way that if the CQI report has been very stable over a longer time, then it may assume that the channel quality is the same as for the previous reports.

The method of FIG. 5 starts in 500. In 502, the feedback information packet, such as CQI and ACK/NACK information, is received and a quality estimate is calculated in the base station. When repetitions are used, the method may proceed as follows: after the next feedback information packet is received, the two received packets may be combined to provide a combining gain. The quality estimate may be calculated using all of the received feedback information packets at the time. Thus, once a feedback information packet has been received, information from all of the previously received packets may be included. If enough repetitions are used, then the combined information packet may be converged into the transmitted information. In 504, it is detected whether the calculated quality estimate shows high reliability or whether it has been stable for a given period of time. In 506, based on the quality estimate, the link adaptation and the packet scheduling may be executed even before all the repetitions have been received. The link adaptation and packet scheduler unit makes the decision to execute the link adaptation and packet scheduling based on the quality estimate. Thus, the link adaptation and packet scheduling delays may be reduced. The quality estimate can be used to improve the measurements used by the packet scheduling and link adaptation unit but they operate independently of the measurements itself. In 510, it is detected whether all the repetitions have been received, and that being the case, the link adaptation and packet scheduling are executed in 506. The method ends in 508.

It is possible that there are also other methods to determine the instantaneous channel quality of the user equipment. In an embodiment, measurements on the associated DPCH (Dedicated Physical Channel) channel may also be used. The CQI channel quality estimate may be used to weight the use of the CQI compared to other measurements. Further, the CQI may in this case be used in an outer loop algorithm and weighting the impact of the CQI by its reliability may be useful.

In an embodiment, the quality estimate may be used for outer loop compensation, and thus reduce the delay of the first transmission if the scheduled repetitions have high reliability.

Finally, an example method for calculating the quality estimate, for example when estimating the uplink channel quality, is presented. In this example, the coding of the H-ARQ information may be a simple repetition coding, since this information is represented by either a NACK (logical 0) or an ACK (logical 1). The reason for this simple repetition coding is that it is not possible to add any forward error correction coding to improve performance since the signalling information is only binary. The coding for the CQI information may be based on a (20,5) block coder. This coder may map a five-bit word representing the CQI into a 20-bit code word calculated using the following equation 1:

$$b_i = \sum_{n=0}^{4} (a_n \times M_{i,n}) \bmod 2 \quad \text{Equation (1)}$$

where the $a_n$ numbers represent the 5 bits for the CQI values, which in total covers the range from 0 to 30, $a_0$ represents the LSB (least significant bit), and $a_4$ represents the MSB (most significant bit) for the CQI value. The values for $M_{i,n}$ may be obtained from the reference 3GPP TS 25.212 v5.3.0 (2002-12), which contains the values 1 and 0. The value of $b_i$ represents the output data, and i represents the index in the output stream. Thus, from a given CQI value, the corresponding code word to be transmitted is calculated.

The sequence of bits to be transmitted is mapped such that a logical 0 will be transmitted with the value +1, while a logical 1 will be transmitted with the value −1. The transmitted data will be: $txData_i = 1 - 2b_i$.

For the estimation of the CQI value, a set of legal code words corresponding to the 31 different CQI values may be calculated. The decision, upon which the CQI estimate is based, uses the difference between the received data vector and the set of legal values, and the distance metric represents the distance between the received data and the estimated CQI code word. The distance and CQI value estimates may be given by the following equations 2 and 3:

$$d_{CQI} = \sum_{n=1}^{N} |rxData_i - (1 - 2 \cdot b_{i,CQI})| \quad \text{Equation (2)}$$

$$CQI = \arg\min_{CQI}\{d_{CQI}\} \quad \text{Equation (3)}$$

From the coupling between the metric and the corresponding error probability, whenever the metric is less than 10, there is a very high probability that the CQI value may be detected correctly. This metric may then be used as a quality estimator for the application of the CQI values in the base station. For instance, it may be chosen to have an error threshold of $10^{-2}$ on the CQI value, and in this case, the link adaptation module may only utilize the CQI information whenever the distance metric is less than 14. Thus, it will be possible to use and take this information into account when evaluating parameters for link adaptation, and provide increased robustness. The performance of the method can also be improved, for example, by taking all the information available on the HS-DPCCH channel into account.

Even though the invention is described above with reference to an example according to the accompanying drawings, it is clear that the invention is not restricted thereto but it can be modified in several ways within the scope of the appended claims.

The invention claimed is:

1. A method of controlling link adaptation and packet scheduling in a High Speed Downlink Packet Access radio system, the method comprising:
    receiving feedback information from user equipment by a base station over a control channel;
    calculating a quality estimate related to the feedback information by the base station;
    executing link adaptation and packet scheduling based on the calculated quality estimate by the base station;
    measuring a second piece of feedback information from associated Dedicated Physical Channel; and
    weighting a use of a channel quality indicator compared to the second piece of feedback information from the associated Dedicated Physical Channel.

2. The method of claim 1, further comprising:
    informing a link adaptation unit and a packet scheduler unit about the calculated quality estimate,
    wherein the executing comprises executing the link adaptation and packet scheduling by the link adaptation unit and the packet scheduler unit of the base station.

3. The method of claim 1, wherein the calculating comprises calculating the quality estimate related to the feedback information comprising at least one of hybrid automatic repeat request information bits and channel quality indicator information bits.

4. The method of claim 3, wherein the calculating the quality estimate comprises calculating estimates of the hybrid automatic repeat request information and channel quality indicator information in order to make faster link adaptation and packet scheduling decisions.

5. The method of claim 4, wherein the calculating the hybrid automatic repeat request information estimate comprises averaging received hybrid automatic repeat request information bits.

6. The method of claim 4, wherein the calculating estimates of the channel quality indicator estimate comprises:
    calculating a set of legal code words corresponding to different channel quality values; and using a difference between received channel quality indicator information and the set of legal code words to calculate the channel quality indicator estimate.

7. The method of claim 1, wherein the receiving comprises receiving the feedback information over the control channel comprising a High Speed-Dedicated Physical Control Channel.

8. The method of claim 1, wherein the receiving comprises receiving the feedback information over the control channel comprising a Dedicated Physical Control Channel.

9. The method of claim 1, further comprising executing the link adaptation and packet scheduling when the calculated quality estimate shows high reliability.

10. The method of claim 1, further comprising aborting reception of the feedback information, when the calculated quality estimate shows high reliability.

11. A High Speed Downlink Packet Access base station communicating over a control channel with one or more user equipment units, the base station comprising:
 a receiver configured to receive feedback information from the user equipment;
 a calculator configured to calculate a quality estimate related to the feedback information;
 an executor configured to execute link adaptation and packet scheduling based on the calculated quality estimate;
 a measurer configured to measure a second piece of feedback information from associated Dedicated Physical Channel; and
 a weighing unit configured to weigh a use of a channel quality indicator compared to the second piece of feedback information from the associated Dedicated Physical Channel.

12. The High Speed Downlink Packet Access base station of claim 11, wherein the feedback information for calculating the quality estimate comprises at least one of hybrid automatic repeat request information bits and channel quality indicator information bits.

13. The High Speed Downlink Packet Access base station of claim 12, wherein the calculator is configured to calculate estimates of hybrid automatic repeat request information by averaging the received hybrid automatic repeat request information bits.

14. The High Speed Downlink Packet Access base station of claim 12, wherein the calculator is configured to calculate estimates of channel quality indicator information by calculating a set of legal code words corresponding to different channel quality values, and to use a difference between received channel quality indicator information and the set of legal code words to calculate the channel quality estimate.

15. The High Speed Downlink Packet Access base station of claim 11, wherein the executor is configured to execute the link adaptation and packet scheduling when the calculated quality estimate shows high reliability.

16. The High Speed Downlink Packet Access base station of claim 11, wherein the control channel comprises a High Speed Dedicated Physical Control Channel.

17. The High Speed Downlink Packet Access base station of claim 11, wherein the control channel comprises a Dedicated Physical Control Channel.

18. The High Speed Downlink Packet Access base station of claim 11, further comprising:
 an aborting unit configured to abort the reception of the feedback information when the calculated quality estimate shows high reliability.

19. A High Speed Downlink Packet Access base station communicating over a control channel with one or more user equipment units, the base station comprising:
 receiving means for receiving feedback information the user equipment;
 calculating means for calculating a quality estimate related to the feedback information;
 executing means for executing link adaptation and packet scheduling based on the calculated quality estimate;
 measuring means for measuring a second piece of feedback information from associated Dedicated Physical Channel; and
 weighting means for weighting a use of a channel quality indicator compared to the second piece of feedback information from the associated Dedicated Physical Channel.

* * * * *